(12) United States Patent
Meier-Arendt et al.

(10) Patent No.: US 12,157,491 B2
(45) Date of Patent: Dec. 3, 2024

(54) METHOD FOR OPERATING A DRIVER ASSISTANCE SYSTEM, DRIVER ASSISTANCE SYSTEM, VEHICLE, AND COMPUTER PROGRAM AND DATA CARRIER SIGNAL

(71) Applicant: Continental Automotive GmbH, Hannover (DE)

(72) Inventors: Guido Meier-Arendt, Schwalbach a. Ts. (DE); Heidi Von Bychowski, Schwalbach a. Ts. (DE); Katrin Wenzel, Schwalbach a. Ts. (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 618 days.

(21) Appl. No.: 17/276,910

(22) PCT Filed: Aug. 21, 2019

(86) PCT No.: PCT/EP2019/072316
§ 371 (c)(1),
(2) Date: Mar. 17, 2021

(87) PCT Pub. No.: WO2020/057882
PCT Pub. Date: Mar. 26, 2020

(65) Prior Publication Data
US 2021/0394783 A1  Dec. 23, 2021

(30) Foreign Application Priority Data

Sep. 21, 2018 (DE) .................... 10 2018 216 130.5

(51) Int. Cl.
*B60W 60/00* (2020.01)
(52) U.S. Cl.
CPC ................................ *B60W 60/001* (2020.02)

(58) Field of Classification Search
CPC .... B60W 60/001; B60W 30/06; B60W 50/14; B60W 2050/143; B60W 2420/42;
(Continued)

(56) References Cited

U.S. PATENT DOCUMENTS 4,866,776 A * 9/1989 Kasai ...................... H04R 5/02
381/86
10,384,605 B1 * 8/2019 Golgiri .............. B62D 15/0285
(Continued)

FOREIGN PATENT DOCUMENTS

DE     102006041857    4/2007
DE     102008029348    12/2009
(Continued)

OTHER PUBLICATIONS

Office Action dated Sep. 27, 2022 issued in Japanese Patent Application No. 2021-515659.
(Continued)

*Primary Examiner* — Bao Long T Nguyen
(74) *Attorney, Agent, or Firm* — Cozen O'Connor

(57) ABSTRACT

A method for operating a driver assistance system in a vehicle including operating the vehicle at an at least partially automated autonomy level by the driver assistance system, providing at least one acoustic transducer, wherein the at least one acoustic transducer is arranged in an interior of the vehicle, registering, by an evaluation unit, whether a vehicle occupant is present, transmitting an acoustic signal through the acoustic transducer, wherein the acoustic signal has a sound power, wherein the sound power is adjusted by the acoustic transducer, wherein the adjustment of the sound power by the acoustic transducer takes place depending on the presence of a vehicle occupant.

17 Claims, 2 Drawing Sheets

(58) Field of Classification Search
CPC ........... B60W 50/085; B60W 2554/00; B60W 2540/00; B60Q 5/005; B60Q 5/006; B60Q 9/00; G08G 1/166; G08G 1/168; B62D 15/0285; G06V 20/56
See application file for complete search history.

(56) References Cited

U.S. PATENT DOCUMENTS

| | | | |
|---|---|---|---|
| 2015/0025787 | A1 | 1/2015 | Lehner et al. |
| 2016/0005317 | A1* | 1/2016 | Nielsen ................. G08G 1/165 340/435 |
| 2016/0355179 | A1* | 12/2016 | Cannella .................... B60T 7/22 |
| 2017/0297568 | A1* | 10/2017 | Kentley ............ B60W 60/0027 |
| 2017/0315556 | A1* | 11/2017 | Mimura ................ G05D 1/0061 |
| 2018/0015878 | A1* | 1/2018 | McNew ................. B60Q 9/008 |
| 2018/0137697 | A1 | 5/2018 | Dudar |

FOREIGN PATENT DOCUMENTS

| | | |
|---|---|---|
| DE | 102009029388 | 3/2011 |
| DE | 102010053293 | 6/2012 |
| DE | 102012016820 | 4/2014 |
| DE | 102014011811 | 2/2016 |
| DE | 102016008338 | 2/2017 |
| DE | 102016201813 | 3/2017 |
| DE | 112015007174 | 8/2018 |
| EP | 0945317 | 9/1999 |
| EP | 3340206 | 6/2018 |
| JP | H 10-236227 | 9/1998 |
| JP | 2006-175998 | 7/2006 |
| JP | 2006-335312 | 12/2006 |
| JP | 2010236227 | 10/2010 |
| JP | 2017-535862 | 11/2017 |

OTHER PUBLICATIONS

Office Action of the corresponding German Patent Application No. 10 2018 216 130.5.
Office Action dated Apr. 27, 2022 issued in Japanese Patent Application No. 2021-515659.
Office Action dated Jan. 2, 2024, issued in Chinese Patent Application No. 201980058874.3.
Office Action dated Jun. 6, 2024 issued in Chinese Patent Application No. 201980058874.3.

* cited by examiner

METHOD FOR OPERATING A DRIVER ASSISTANCE SYSTEM, DRIVER ASSISTANCE SYSTEM, VEHICLE, AND COMPUTER PROGRAM AND DATA CARRIER SIGNAL

CROSS REFERENCE TO RELATED APPLICATIONS

This is a U.S. national stage of Application No. PCT/EP2019/072316 filed Aug. 21, 2019. Priority is claimed on German Application No. DE 10 2018 216 130.5 filed Sep. 21, 2018 the content of which is incorporated herein by reference.

BACKGROUND OF THE INVENTION

1. Field of the Invention

Disclosed is a method for operating a driver assistance system, a driver assistance system, a vehicle, computer program, and data carrier signal The disclosure relates to a method for operating a driver assistance system, in particular a parking assistance system, in a vehicle. The disclosure furthermore relates to such a driver assistance system, to a vehicle, and also to a computer program and to a data carrier signal.

2. Description of Related Art

Nowadays modern vehicles have convenience and assistance systems that greatly simplify the driving of a vehicle for the driver. One of these assistance systems is, for example, a parking assistance system. This supports parking the vehicle into a parking space or in a parking area. The parking assistance systems usually comprise a plurality of sensors with which a vehicle surroundings of the vehicle are searched for obstacles or other sources of danger, and thus monitor the surroundings of the vehicle. Systems for the support of manual or partially automated parking procedures here provide for the output of visual and acoustic information. In order to convey information about the surroundings to the driver, for example a distance from obstacles, information is output on vehicle displays.

If a parking space or a parking area is detected, a parking assistance system supplies supporting advice for a driver relating to how he must guide the vehicle in order to park the vehicle into the detected parking space.

Particularly convenient systems are able to execute individual maneuvers, or all the necessary maneuvers required for this, themselves. These systems can, for example, also be referred to as parking steering assistance systems or parking steering assistants. The sensors are connected to an autonomous control device that acquires and evaluates the sensor signals. The control device can prepare a model of the vehicle surroundings on the basis of the evaluated sensor signals, and can communicate with further, separate, autonomous systems in order to execute suitable steering, driving or braking maneuvers. In particular this enables a simple and economical implementation of functions such as fully automatic parking, for example what is known as valet parking or what is known as trained parking.

In valet parking, the driver parks the vehicle that is to be parked within a marked zone known as the drop zone, starts the parking procedure, and leaves the vehicle. The vehicle starts the parking procedure into, for example, a parking space in a parking garage.

In trained parking, the vehicle is trained for a parking maneuver within a zone, for example in front of a garage, defined by the driver. In order to park, the driver parks the vehicle that is to be parked within the zone defined by the driver, starts the parking procedure, and leaves the vehicle. The vehicle starts a previously trained parking procedure, for example reverse parking in front of the garage. Trained parking systems record information about the surroundings that correspond to a trained parking procedure that has been driven, and when subsequently replayed correlate the newly acquired information with the previously stored information.

The vehicles here move autonomously, i.e. without the involvement of a human driver, to an assigned parking area, and back to a pick-up position.

In driver assistance systems, in particular parking assistance systems for automated parking, signals indicating that the vehicle is moving automatically are given to road users in the surroundings of the automatically parking vehicle. Methods are known for this purpose with which information is projected onto the roadway by optical projection devices such as a matrix light, LED headlamps, or laser projection.

DE 102014011811 A1 discloses a vehicle with a lighting system for informing a road user about a planned movement of the vehicle. The information is provided to the road user by displaying a light pattern on a drivable surface. The lighting system is configured to generate the light pattern with a first feature through which the road user can recognize that the vehicle is in an operating mode under autopilot control.

DE 102006041857 A1 discloses a method for the improvement of road safety while a vehicle is driving on a freeway, comprising the steps of discovering at least one object in the immediate surroundings of the vehicle, analyzing at least one discovered object, deciding whether at least one analyzed object is relevant to the conditions of road safety for driving the vehicle, and illuminating the roadway by a light source with a light pattern that indicates at least one object that is deemed to be relevant to the conditions of road safety for the driving of a vehicle.

DE 102016008338 A1 discloses a vehicle with an autonomous driving system that enables a complete or partial autonomous driving of the vehicle, with a vehicle lighting system and with a control device which, in the event of autonomous or partially autonomous driving, generates visual signals by means of the lighting system, wherein the visual signals exhibit a color and/or style of flashing that differs from previous light signals.

In the field of commercial vehicles, signal tones are output during manual reversing by means of what are known as piezo buzzers. Such piezo buzzers however exhibit a heavily restricted sound quality. The use of piezo buzzers is, moreover, associated with additional costs.

SUMMARY OF THE INVENTION

One aspect of the invention is providing an autonomous driving mode/an automatic operating mode reliably and economically and without further additional equipment in the vehicle.

One aspect of the invention is a method for operating a driver assistance system and a driver assistance system. One aspect of the invention is a vehicle, a computer program, and a data carrier signal.

The object is achieved by specifying a method for operating a driver assistance system, in particular a parking assistance system, in a vehicle, comprising the following:

operating the vehicle at an at least partially automated autonomy level by the driver assistance system, providing at least one acoustic transducer, wherein the at least one acoustic transducer is arranged in an interior of the vehicle, registering, by an evaluation unit, whether a vehicle occupant is present, transmitting an acoustic signal through the acoustic transducer, wherein the acoustic signal has a sound power, wherein the sound power is adjusted by the acoustic transducer, wherein the adjustment of the sound power by the acoustic transducer takes place depending on the presence of a vehicle occupant.

Until now, autonomous driving has been divided into six levels, from level "zero" up to level "five". At least partially automated autonomy levels are to be understood here to refer to autonomy levels starting from level "two", which is known as partial automation. These contain functions such as automatic parking and/or lane keeping and so forth. From level "three", conditional automation, the vehicle autonomously performs functions such as actuating the indicator, lane changing and lane keeping. Level "four" refers to a high level of automation in which control of the vehicle can be permanently undertaken by the system. Level "five" refers to full automation in which a driver is no longer necessary.

An acoustic transducer refers preferably to a loudspeaker and/or a microphone. Sound power refers to a sound energy of a sound source output per unit time by the sound source; this is an acoustic magnitude. By setting the sound power, the sound level, which is to say the sound pressure level that describes the effect of the sound at a particular location and that depends heavily on the kind of surroundings, for example being in a room or in the open, and on the distance from the sound source, can be adjusted.

Vehicle occupants can be persons or, however, can also be animals. The presence of vehicle occupants can be ascertained in a variety of ways, for example through seat sensors.

As soon as an automated driving procedure, preferably an automated parking procedure, starts, the output of acoustic signals can be performed with the aid of acoustic transducers such as loudspeakers located or arranged in the vehicle interior, in order to inform and warn weaker road users such as pedestrians or cyclists in the vicinity of the vehicle. The setting of the sound power is performed here depending on the presence of a vehicle occupant. If no vehicle occupants are present, a significantly higher sound power can be set than is possible, for example, in the presence of a vehicle occupant. This takes into account the fact that in the presence of a vehicle occupant said occupant can, if necessary, intervene in the driving procedure, for example in the event of a threatened collision with a pedestrian.

A higher sound power is possible if there are no vehicle occupants in the vehicle, as a result of which hearing damage to such an occupant cannot occur. If there are vehicle occupants in the vehicle, then acoustic signals cannot be output, or only acoustic signals with a markedly reduced sound power.

With the aid of acoustic transducers present at the vehicle, for example loudspeakers from the interior, for example of the entertainment system, acoustic signals relating to automated driving procedures, in particular parking procedures for autonomous or remotely controlled parking procedures, can be transmitted in such a way that they can also be perceived by road users outside the vehicle. These can in particular be perceived both by the user as well as by other road users located in the surroundings of the parking procedure.

This brings about an improved warning of road users who are at particular risk from an autonomous driving procedure.

The use of loudspeakers installed additionally in an exterior region of the vehicle, which is associated with additional costs, can be avoided according to one aspect of the invention. As a result of the adjustability of the sound power by the acoustic transducer depending on the presence of a vehicle occupant, costs can be saved, since no further acoustic signal transducers are required in the exterior region of the vehicle.

Acoustic loudspeakers used until now furthermore only have a heavily restricted sound quality. The interior acoustic transducers exhibit a higher acoustic output quality.

Particularly preferably, an at least partial opening of an openable window of the vehicle is performed through the actuation of a window lifter, depending on the set sound power, wherein the actuation is performed by the driver assistance system, and/or at least a partial opening of an openable sliding roof of the vehicle is performed through the actuation of a sliding roof drive apparatus, depending on the set sound power, wherein the actuation is performed by the driver assistance system. The window or windows in particular comprise the vehicle side windows. The acoustic signals can thus be better perceived by the road users. Initiated by the system, the vehicle side windows are opened by a few centimeters by the driver assistance system. If no acoustic signals, or only reduced acoustic signals, are provided, for example as a result of vehicle occupants, then an opening of the vehicle side windows initiated by the system can be omitted.

An ascertainment is preferably made as to whether at least one movable object is acquired by at least one sensor of the vehicle, wherein the at least one sensor is designed for the acquisition of movable objects within a surroundings of the vehicle, wherein an at least partial opening of at least one window by the window lifter is effectuated, wherein the at least one window is arranged on the side of the vehicle that faces toward the object. Unnecessary noise pollution can thereby be avoided, while the perception of the vehicle driving automatically is simultaneously increased.

Movable objects refers above all to other road users, but also however to animals. Targeted action can in this way be made to ensure that the road users are made aware of the vehicle that is driving in the at least partially automated mode. If sensors on the vehicle recognize an approaching road user, for example in the region to the left of the vehicle, then the left-hand side window is opened or is opened further. Preferably the sound power of the left-hand acoustic transducer, for example a loudspeaker, internal to the vehicle can be increased for the output of acoustic signals in order to ensure that the road user perceives the autonomously driving vehicle.

In one preferred embodiment, an ascertainment is made as to whether at least one object is acquired by at least one sensor of the vehicle, wherein the at least one sensor is designed to acquire movable objects within a vehicle surroundings, wherein the sound power is adjusted depending on the distance of the acquired object from the vehicle. Preferably, at a high distance of the object, i.e. the road user, a low sound power is output, and a high sound power is output at a closer distance. A road user located close to the vehicle is thus warned of the vehicle significantly more urgently by the higher sound power than is a road user who is still very far away. This increases road safety.

An ascertainment is preferably made alternatively or in addition as to whether at least one object is acquired by at least one sensor of the vehicle, wherein the at least one sensor is designed to acquire movable objects within a vehicle surroundings, wherein the sound power is adjusted depending on the direction of movement of the acquired object with respect to the vehicle.

If road users distance themselves from the vehicle, the sound power is preferably lowered, while if the road users come closer, the sound power is preferably increased. The adjustment of the sound power is preferably made depending on the distance and a direction of movement of recognized road users. Thus the smaller the distance between the vehicle and the road user, the higher is the sound power. This increases the safety of the road users in the surroundings of the at least partially automated vehicle. A risk of collision between a road user and the autonomously driving vehicle is thereby significantly lowered.

Through the adjustment of the sound power, initiated by the system, as well as through the opening of the windows initiated by the system, the acoustic signals can thus be better perceived by the respective road users.

In a further preferred embodiment, a visual signal is output by a lighting unit, wherein the lighting unit is designed to output the visual signal to at least a part of the surroundings of the vehicle. Through an additional visual output, an increase in the safety of the further road users located in the surroundings of the vehicle is generated.

In an additional preferred embodiment, the driver assistance system is designed as a parking assistance system to effectuate a parking procedure or a procedure of pulling out of a parking space. The parking procedure and/or the procedure of pulling out of a parking space advantageously comprises at least two different parking procedures. It is particularly preferable if at least the start of the parking/pulling out comprises a first parking procedure, maneuvering the vehicle comprises a second parking procedure, ending the parking/pulling out comprises a third parking procedure.

Further parking procedures can, for example, be one or more of:
  the vehicle is in the automated parking mode,
  the vehicle has discovered one or a plurality of road users,
  the vehicle has detected one or a plurality of weaker road users, for example pedestrians or cyclists, in the vicinity of the vehicle, that with a high probability are moving in the direction of the parking procedure that has been planned by the system,
  the vehicle pauses the parking procedure,
  the vehicle continues the parking/pulling out procedure,
  the vehicle has completed the parking/pulling out procedure, and
  output of vehicle errors (system problem).

Preferably, different acoustic signals are made available for at least two, preferably for all, different parking procedures. It is further preferable if the acoustic signal is designed as a voice output and/or a sound output, in particular a melody and/or a tone output, in particular a warning tone. What are known as earcons, which are short melodic sequences and/or voice text and/or voice outputs, can be output here. A combination is likewise possible. A warning tone can, for example, be output if a rapidly approaching road user, for example a cyclist, approaches the vehicle that is parking or pulling out.

A high bandwidth of different acoustic signals can thus be generated through the use of acoustic transducers in the interior. A personalized configuration of the acoustic signals is additionally possible. The driver can here choose between, for example, different sound schemes for different parking procedures. Through this he recognizes the status/progress of the parking/pulling out procedure precisely.

The sound power is preferably adjusted depending on at least one surroundings parameter of the vehicle. A typical surroundings parameter here is the weather conditions, for example temperature, time of day, weather conditions, in particular whether the weather is dry or wet. Opening the window is preferably not initiated in the rain. The traffic density can be a further surroundings parameter. The sound power can be increased in fog or in the presence of a high traffic density, in order to compensate for the poor visibility.

The object is furthermore achieved through the provision of a driver assistance system in a vehicle for carrying out the method as described above, the driver assistance system comprising at least one first operating mode for operating the vehicle at an at least partially automated autonomy level, an evaluation unit that is designed to register a presence of a vehicle occupant, and at least one acoustic transducer, in particular a loudspeaker and/or a microphone, wherein the at least one acoustic transducer is arranged in an interior of the vehicle and is designed for the transmission of an acoustic signal with a sound power, wherein the sound power can be adjusted by the acoustic transducer, wherein the sound power can be adjusted by the acoustic transducer depending on the presence of a vehicle occupant.

The sound power can thus be kept low, or no acoustic signal output, in the presence of a vehicle occupant. When not present, the sound power can be increased. The advantages of the method may also be transferred to the driver assistance system.

In one preferred embodiment, at least one opened window is provided, wherein the at least one window is designed in such a way that the window can be at least partially opened through the actuation of a window lifter, wherein the actuation takes place depending on the sound power set by the driver assistance system, and/or an opened sliding roof, wherein the sliding roof is designed in such a way that the sliding roof can be at least partially opened through the actuation of a sliding roof drive apparatus, wherein the actuation takes place depending on the sound power set by the driver assistance system.

The opening of the windows thus takes place depending on the set sound power. This takes place depending on the presence of a vehicle occupant. Preferably, therefore, in the presence of a vehicle occupant, i.e. when the sound power is reduced or even zero, no window opening occurs. At a high sound power, and in the absence of a vehicle occupant, an at least partial opening of the windows can take place.

In a further preferred embodiment, a sensor is provided for the acquisition of at least one movable object within a vehicle surroundings, wherein the at least partially opened window is arranged on the side of the vehicle that faces toward the object.

This means that if there is a road user, for example a pedestrian, on the side facing the driving side, at least one window is opened on this side, and if there is a road user, for example a pedestrian, on the side facing the passenger side, at least one window is opened on this side. Through this, the registration of the autonomously driving vehicle by the pedestrian/road user can be increased while the volume remains constant.

It is further preferable to provide a sensor for the acquisition of at least one movable object within a vehicle surroundings. The acoustic transducer is preferably designed for adjusting the sound power depending on the distance of the acquired object from the vehicle. The sound power is low here when the object, i.e. the road user, is far away from the vehicle, and is high when the object, i.e. the road user, is close to the vehicle.

Preferably a sensor is provided for the acquisition of at least one movable object within a vehicle surroundings. The acoustic transducer is preferably designed for adjusting the sound power depending on the direction of movement of the acquired object with respect to the vehicle. The sound power is low here when the object, i.e. the road user, is approaching the vehicle, and is reduced when the object, i.e. the road user, is moving away from the vehicle.

Preferably, the acoustic signal is designed as a voice output and/or a sound output, in particular a melody and/or a tone output, in particular a warning tone. The warning tone can, for example, be used in the presence of a cyclist or pedestrian that is approaching quickly. A vehicle owner/driver located nearby can quickly recognize through the different acoustic signals whether, for example, a parking/pulling out procedure is still taking place in a normal manner, or whether he must take measures to prevent danger to a road user, for example stopping the parking procedure immediately.

Particularly preferably the driver assistance system is a parking assistance system. Such a system is already integrated/present in many vehicles.

The object is further achieved through the provision of a vehicle with a driver assistance system as described above comprising an interior with an acoustic transducer. The vehicle is in particular a motor vehicle for the transport of persons.

The object is furthermore achieved through the provision of a computer program comprising commands that cause the driver assistance system above to execute the method as described above. The computer program can in particular be subsequently installed in all vehicles that comprise a driver assistance system.

The object is furthermore achieved through the provision of a data carrier signal that transmits the above-mentioned computer program. An electronic data carrier signal is formed by any digital signal sequence that is able to be stored in a volatile or non-volatile electronic memory. Such a computer program may be transmitted for example via cloud or a network, for example by the vehicle manufacturer within the context of retrofitting, without the vehicle owner having to find a garage.

BRIEF DESCRIPTION OF THE DRAWINGS

Further features, properties and advantages of the present invention emerge from the following description with reference to the attached figures. These show, schematically.

DETAILED DESCRIPTION OF THE PRESENTLY PREFERRED EMBODIMENTS

Although the invention has been described and illustrated in more detail by a preferred exemplary embodiment, the invention is not limited by the disclosed examples. Variations thereof may be derived by a person skilled in the art without departing from the scope of protection of the invention as is defined by the following patent claims.

Figure 1:
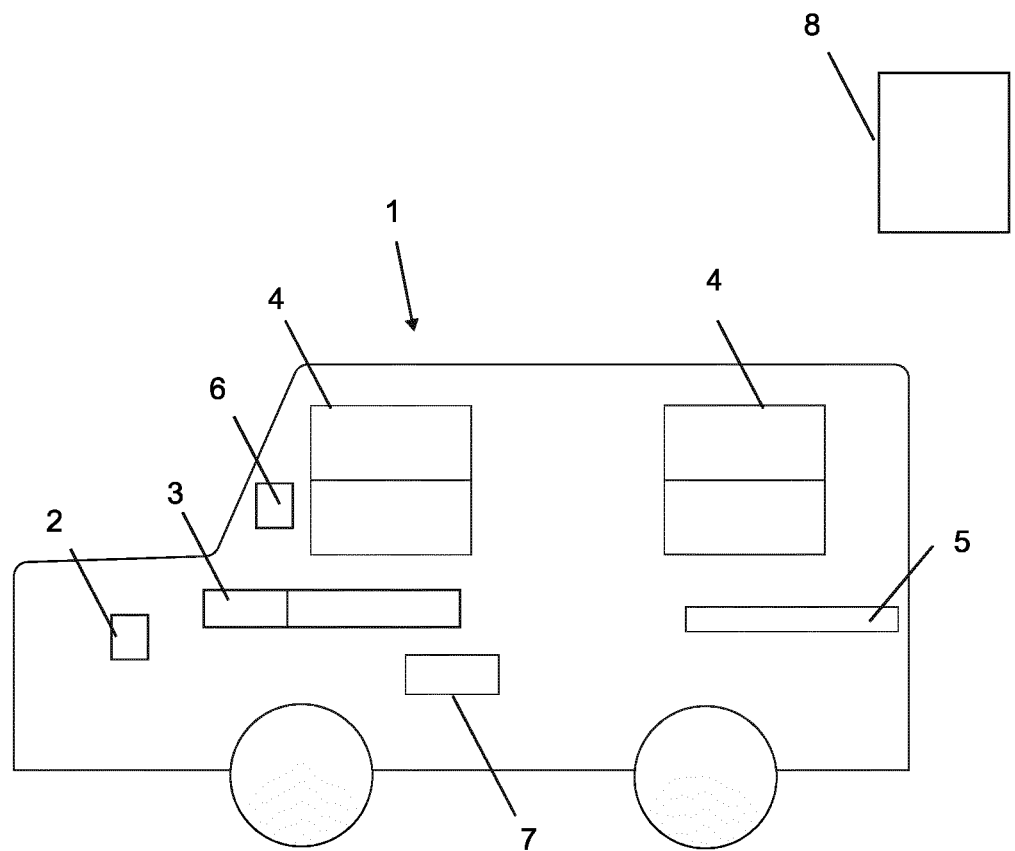
FIG. 1 is a block diagram illustration of a vehicle with a driver assistance system designed as a parking assistance system.

FIG. 1 schematically shows a vehicle 1 with a driver assistance system designed as a parking assistance system according to one aspect of the invention. The parking assistance system 2 comprises sensors 3 that can also be used to survey the parking space. These sensors can comprise a front sensor, a side sensor, or a rear sensor or sensor arrays. The sensors can preferably be designed as ultrasonic sensors. The vehicle 1 further comprises windows 4, wherein the windows 4 are actuated, meaning that they can be opened and closed, by window lifters. The window lifters can here be actuated by the parking assistance system 2. A sliding roof (not shown) with a sliding roof drive apparatus can also be provided, and can again be actuated by the parking assistance system 2.

An optical lighting unit 5 is further provided, attached to the vehicle 1 and facing out into the vehicle surroundings. The vehicle 1 comprises a plurality of acoustic transducers on the left-hand and right-hand sides designed as interior loudspeakers 6, which are identified here with reference sign 6; left-hand side and right-hand side refer here to being at the driver's door or facing the driver's door, and at the passenger's door on the other side. The interior loudspeakers 6 comprise a regulator for adjusting the volume. The regulator, or a further regulator, can furthermore be designed to adjust the volumes of the left-hand and right-hand side interior loudspeaker 6 separately.

The parking assistance system 2 furthermore comprises seat sensors 7 that can be installed in the seat, or ultrasonic sensors, for acquiring the presence of a vehicle occupant. The vehicle 1 can furthermore comprise a communication interface for externally connecting to a cloud 8 or to an external server. An update to the method can thus be installed into the vehicle 1 at any time without difficulty.

Figure 2:
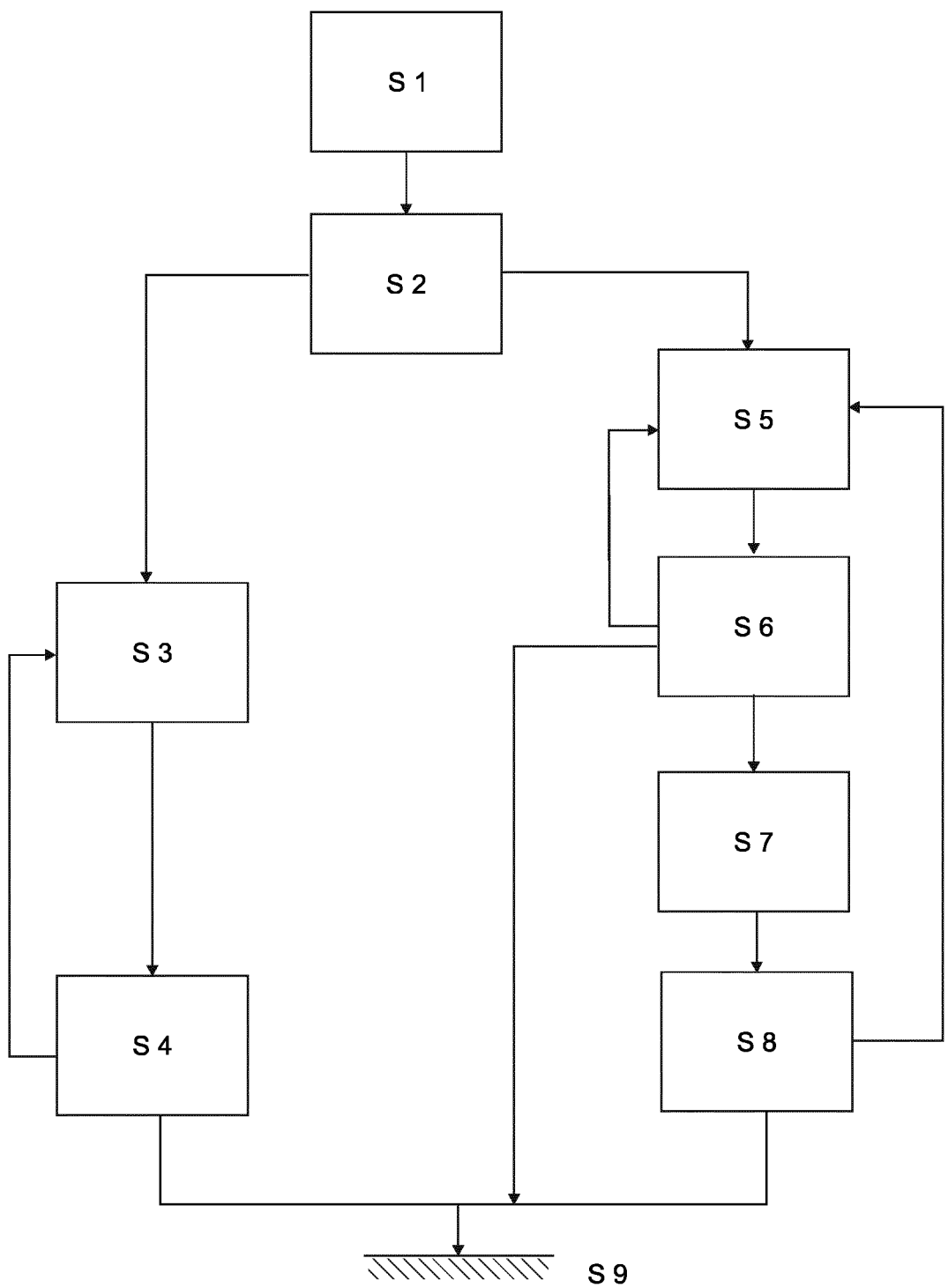
FIG. 2 is a flow diagram of a method according to one aspect of the invention.

FIG. 2 shows a method according to one aspect of the invention. In S1 a driver starts an automated parking procedure according to one aspect of the invention in a vehicle 1 (FIG. 1). Such a procedure can be designed as valet parking or trained parking, in which the presence of the driver is not necessary. The parking space can be surveyed for this purpose by sensors 3 (FIG. 1). In S2, the parking assistance system 2 (FIG. 2) of the vehicle 1 (FIG. 1) checks whether there are vehicle occupants inside the vehicle 1 (FIG. 1). This is, for example, checked by seat sensors 7 (FIG. 1).

If one or a plurality of vehicle occupants are present in the vehicle (1 (FIG. 1)), then S3 is executed, and the parking assistance system 2 (FIG. 1) is placed into "a vehicle occupant is present" mode. This means that a sound power of zero, or a heavily limited sound power, is set at the interior loudspeaker 6 (FIG. 1), to protect the vehicle occupants from excessive noise/sound. An indication is nevertheless provided through an optical lighting unit 5 at the external bodywork of the vehicle. A check is made in S4 as to whether the vehicle 1 (FIG. 1) has reached its final parking position. If yes, the method is ended at S9.

If no, the method is continued in S3 until the final parking position has been reached.

If no vehicle occupants are present in the vehicle 1 (FIG. 1), then S5 is executed, and the parking assistance system 2 (FIG. 1) is placed into "a vehicle occupant is not present" mode. An indication is provided in S5 through an optical lighting unit 5 at the external bodywork of the vehicle. In a next act S6, the surroundings parameters, that is to say whether or not it is raining, are checked with reference to sensors. In addition, a check is made using a further sensor as to whether road users are located within a vehicle surroundings. The precise position, i.e. whether the road user is on the side facing the driver's side or the side facing the passenger's side, and the distance from the vehicle 1 (FIG. 1), as well as the direction of movement, are acquired. The interior loudspeaker 6 is now adjusted depending on the situation. If a weaker road user is not discovered, then S5 and S6 are carried out again, until the method is ended at S9.

If a weaker road user is discovered in S7, then the sound power of the interior loudspeaker 6 is set in S8 depending on the ascertained surroundings parameters, the distance and the direction of movement, and, depending on the weather, at least that window side that faces the road user is opened. This means that if a road user is ascertained on the side that faces the driver's side, then in dry weather the window is opened on this side, and the sound power of the interior loudspeaker 6 (FIG. 1) is set on this side with reference to the ascertained parameters.

Other devices belonging to the vehicle that can effectuate an acoustic output can also be employed for this purpose. If the driver is far away, then a low sound power can be set that grows as the road user gets closer to the vehicle 1 (FIG. 1). Different acoustic signals can, furthermore, be output. If the road user is very close to the parking vehicle, then a loud signal tone/warning tone can, for example, be output. The start of the parking procedure and its end can also be indicated by short signal tones. This can also be supported by a voice output such as "parking procedure started". A check is made in S9 as to whether the vehicle 1 (FIG. 1) has reached its parking position. If not, S5, S6, S7, and S8 are carried out again in sequence. If the vehicle 1 (FIG. 1) has reached its position, the method is ended at S9.

The method can be applied to all autonomous driving procedures such as, for example, pulling out of a parking space, driving in a traffic jam, and so forth.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

The invention claimed is:

1. A method for operating a driver assistance system, configured as a parking assistance system, in a vehicle comprising:
   operating the vehicle at an at least partially automated autonomy level by the driver assistance system;
   providing at least one acoustic transducer, wherein the at least one acoustic transducer is arranged in an interior of the vehicle;
   registering, by an evaluation unit, whether a vehicle occupant is present; and
   transmitting an acoustic signal through the at least one acoustic transducer,
   wherein the acoustic signal has a sound power that is adjusted by the at least one acoustic transducer,
   wherein the adjustment of the sound power by the at least one acoustic transducer takes place based at least in part on a presence of a vehicle occupant,
   ascertaining whether at least one movable object is acquired by at least one sensor of the vehicle,
   wherein the at least one sensor is configured to acquire movable objects within a surrounding of the vehicle; and
   opening by the driver assistance system, at least partially, an openable window of the vehicle by actuating a window lifter, depending on the adjusted sound power and an ascertained movable object within the surrounding of the vehicle; and
   at least a partial opening of an openable sliding roof of the vehicle by a sliding roof drive apparatus, depending on the adjusted sound power, by the driver assistance system.

2. The method as claimed in claim 1,
   wherein the openable window is arranged on a side of the vehicle that faces toward the object.

3. The method as claimed in claim 1, further comprising:
   ascertaining whether at least one object is acquired by at least one sensor of the vehicle,
   wherein the at least one sensor is configured to acquire movable objects within a surrounding of the vehicle; and
   adjusting the sound power based at least in part on one or more of:
      a distance of the acquired object from the vehicle and
      a direction of movement of the acquired object with respect to the vehicle.

4. The method as claimed in claim 1, further comprising:
   outputting a visual signal by a lighting unit configured to output the visual signal to at least a part of a surrounding of the vehicle.

5. The method as claimed in claim 1, wherein the driver assistance system is configured to effect a parking procedure and/or procedure for pulling out of a parking space, and the parking procedure and/or a pulling-out procedure comprises at least two different parking procedures.

6. The method as claimed in claim 5, wherein at least a start of the parking and/or of the pulling out of the parking space comprises a first parking procedure, maneuvering the vehicle comprises a second parking procedure, and ending the parking and/or pulling out comprises a third parking procedure.

7. The method as claimed in claim 6, wherein different acoustic signals are made available for at least two different parking procedures.

8. The method as claimed in claim 1, wherein the acoustic signal is one or more of a voice output, a sound output, a melody, a tone output, and a warning tone.

9. The method as claimed in claim 1, wherein the sound power is adjusted depending on at least one surrounding parameter of the vehicle.

10. The method as claimed in claim 1, wherein the sound power is a first sound power when the vehicle occupant is present and a second sound power higher than the first sound power when the vehicle occupant is not present.

11. A driver assistance system in a vehicle configured as a parking assistance system and to operate the vehicle at an at least partially automated autonomy level by the driver assistance system, comprising:
   at least one first operating mode for operating the vehicle at the at least partially automated autonomy level;
   an evaluation unit configured to register a presence of a vehicle occupant; and at least one acoustic transducer arranged in an interior of the vehicle and configured for a transmission of an acoustic signal with a sound power, wherein the sound power is adjustable by the at least one acoustic transducer, and wherein the sound power can be adjusted by the at least one acoustic transducer based at least in part on a presence of a vehicle occupant, at least one sensor of the vehicle configured to ascertain at least one movable object, wherein the at least one sensor is configured to acquire movable objects within a surrounding of the vehicle; and opening by the driver assistance system, at least partially, an openable window of the vehicle by actuating a window lifter, depending on the adjusted sound power; and the driver assistance system configured to open, at least partially, the openable window of the vehicle by actuating the window lifter, depending on the adjusted sound power and an ascertained movable object within the surrounding of the vehicle, wherein an opened sliding roof is provided, wherein the sliding roof is designed in such a way that the sliding roof can be at least partially opened through an actuation of a sliding roof drive apparatus, wherein each actuation takes place depending on the sound power set by the driver assistance system.

12. The driver assistance system as claimed in claim 11, wherein the at least partially opened window is arranged on a side of the vehicle that faces toward the object.

13. The driver assistance system as claimed in claim 11, further comprising:

a sensor configured to acquire at least one movable object within a vehicle surroundings, wherein the at least one acoustic transducer adjusts the sound power depending on a distance of the acquired object from the vehicle.

14. The driver assistance system as claimed in claim 11, further comprising:

a sensor configured to acquire at least one movable object within a vehicle surroundings, wherein the at least one acoustic transducer adjusts the sound power based at least in part on a direction of movement of the acquired object with respect to the vehicle.

15. The driver assistance system as claimed in claim 11, wherein the acoustic signal is one or more of a voice output, a sound output, a melody, a tone output, and a warning tone.

16. A vehicle, comprising:

an interior; and a driver assistance system, comprising:

at least one first operating mode for operating the vehicle at an at least partially automated autonomy level;

an evaluation unit configured to register a presence of a vehicle occupant; and at least one acoustic transducer arranged in an interior of the vehicle and configured for a transmission of an acoustic signal with a sound power, wherein the sound power is adjustable by the at least one acoustic transducer, and wherein the sound power can be adjusted by the at least one acoustic transducer based at least in part on a presence of a vehicle occupant, at least one sensor of the vehicle configured to ascertain whether at least one movable object, wherein the at least one sensor is configured to acquire movable objects within a surrounding of the vehicle; and wherein the driver assistance system is configured to open, at least partially, an openable window of the vehicle by actuating a window lifter, depending on the adjusted sound power and an ascertained movable object within the surrounding of the vehicle; and wherein an opened sliding roof is provided, wherein the sliding roof is designed in such a way that the sliding roof can be at least partially opened through an actuation of a sliding roof drive apparatus, wherein each actuation takes place depending on the sound power set by the driver assistance system.

17. A computer program stored on a nontransitory computer readable medium comprising commands that cause a driver assistance system to:

operate a vehicle at an at least partially automated autonomy level by the driver assistance system;

provide at least one acoustic transducer, wherein the at least one acoustic transducer is arranged in an interior of the vehicle;

register, by an evaluation unit, whether a vehicle occupant is present;

transmit an acoustic signal through the at least one acoustic transducer, wherein the acoustic signal has a sound power that is adjusted by the at least one acoustic transducer, wherein the adjustment of the sound power by the at least one acoustic transducer takes place based at least in part on a presence of a vehicle occupant, ascertain whether at least one movable object is acquired by at least one sensor of the vehicle, wherein the at least one sensor is configured to acquire movable objects within a surrounding of the vehicle;

wherein the driver assistance system is configured to open, at least partially, an openable window of the vehicle by actuating a window lifter, depending on the adjusted sound power and an ascertained movable object within the surrounding of the vehicle; and at least a partial opening of an openable sliding roof of the vehicle by a sliding roof drive apparatus, depending on the adjusted sound power, by the driver assistance system.

* * * * *